(12) United States Patent  (10) Patent No.: US 9,262,152 B1
Kurian et al.  (45) Date of Patent: Feb. 16, 2016

(54) MODULAR SYSTEM INCLUDING MANAGEMENT AND DEPLOYMENT OF SOFTWARE UPDATES AND REVISIONS

(71) Applicant: BANK OF AMERICA CORPORATION, Charlotte, NC (US)

(72) Inventors: Manu Jacob Kurian, Dallas, TX (US); Sorin N. Cismas, Addison, TX (US)

(73) Assignee: BANK OF AMERICA CORPORATION, Charlotte, NC (US)

( * ) Notice: Subject to any disclaimer, the term of this patent is extended or adjusted under 35 U.S.C. 154(b) by 0 days.

(21) Appl. No.: 14/603,144

(22) Filed: Jan. 22, 2015

(51) Int. Cl.
G06F 9/44 (2006.01)
G06F 9/445 (2006.01)
H04L 29/08 (2006.01)

(52) U.S. Cl.
CPC . *G06F 8/65* (2013.01); *H04L 67/10* (2013.01)

(58) Field of Classification Search
CPC .................................. G06F 8/65; H04L 64/10
USPC .......................................................... 717/170
See application file for complete search history.

(56) References Cited

U.S. PATENT DOCUMENTS

| 8,832,643 | B2 * | 9/2014 | Schmeling | G06F 8/10 717/101 |
|---|---|---|---|---|
| 2004/0093594 | A1 * | 5/2004 | Kapadia | G06Q 10/06 717/170 |
| 2010/0306757 | A1 * | 12/2010 | Becker | G06F 9/44536 717/170 |
| 2013/0036060 | A1 * | 2/2013 | Kumar | G06Q 10/06 705/301 |
| 2013/0166311 | A1 * | 6/2013 | Stock | G06F 8/63 705/2 |
| 2013/0198050 | A1 * | 8/2013 | Shroff | H04L 41/5009 705/34 |
| 2014/0019426 | A1 * | 1/2014 | Palmer | G06F 17/30221 707/694 |
| 2014/0156323 | A1 * | 6/2014 | Prieto | G06Q 10/0633 705/7.12 |
| 2014/0278711 | A1 * | 9/2014 | Fuller | G06Q 10/06315 705/7.25 |
| 2015/0058835 | A1 * | 2/2015 | Hayami | G06F 8/61 717/170 |
| 2015/0074278 | A1 * | 3/2015 | Maes | H04L 47/70 709/226 |
| 2015/0180949 | A1 * | 6/2015 | Maes | H04L 43/10 709/201 |
| 2015/0199197 | A1 * | 7/2015 | Maes | G06F 8/71 717/122 |

* cited by examiner

*Primary Examiner* — Don Wong
*Assistant Examiner* — Theodore Hebert
(74) *Attorney, Agent, or Firm* — Michael A. Springs; Moore & Van Allen PLLC; James C. Edwards (57) ABSTRACT

A technology/operating system-agnostic and protocol-agnostic modular-based service delivery system that includes a management of enterprise-wide deployment of services and updates to services delivered by the modules of the system. Management includes determination and automatic implementation of an optimal schedule for service deployment, service version updates and service version roll-backs based on (i) predetermined lifecycle levels assigned to networked devices in the enterprise executing the service delivery application, and/or (ii) segments within the enterprise.

11 Claims, 4 Drawing Sheets

MODULAR SYSTEM INCLUDING MANAGEMENT AND DEPLOYMENT OF SOFTWARE UPDATES AND REVISIONS

FIELD

In general, embodiments of the invention relate to network data communication and, more particularly, a technology-agnostic and protocol-agnostic data modular-based system that includes enterprise-wide, centralized, management over the deployment and updating of services delivered by the modules of the system.

BACKGROUND

In large enterprise businesses, different software systems (otherwise referred to as applications, modules and the like) are deployed for the purpose of carrying out prescribed actions. For example, an enterprise may deploy one or more software systems to monitor the health of the computing system, one or more other software systems to move data throughout the enterprise and one or more other software systems for messaging. All of these software systems are stacked on the servers within the enterprise to carry out the request functionality. Each of these software systems are generally independent of each other; i.e., different commercial manufacturers and/or execute under different operating systems. As such, these diverse software systems require a high degree Information Technology (IT) support and maintenance to ensure that the systems are capable of working in unison. Additionally, each of these independent software systems implement distinct tracking controls and governance, which further increase maintenance costs.

Further, in many large enterprises, computing servers or other networked devices are distributed globally across a diverse computing network infrastructure. The various servers deployed in the network implement many different operating systems that execute a myriad of different software packages, applications, tools and the like. In many instances a single server may host many different software packages, applications or the like.

Further, in large enterprises, with many different computing environments and business units/lines-of-business (LOBs), timely deployment of services and/or the updating/patching of such services is highly problematic. This is because the data associated with servers, business units/LOBs and other data relevant to deploying the updates is spread across many different data sources and the like.

Therefore, a need exists to develop systems, apparatus, computer program products, methods and the like that for a unified and comprehensive service delivery system that is extensible and provides one methodology for accessing Operating Systems (OSs) and all of the servers deployed throughout an enterprise. Further, a need exists to manage deployment of services and updates to such services and, specifically, automate the process of deploying the services and providing updated versions of the services, such that the deployment of critical updates/patches across all computing servers requiring such is ensured and occurs within prescribed time limits. Moreover, a need exists to automatically determine optimal schedule for deploying the software and/or update/patch to each of the network devices requiring such.

SUMMARY OF THE INVENTION

The following presents a simplified summary of one or more embodiments in order to provide a basic understanding of such embodiments. This summary is not an extensive overview of all contemplated embodiments, and is intended to neither identify key or critical elements of all embodiments, nor delineate the scope of any or all embodiments. Its sole purpose is to present some concepts of one or more embodiments in a simplified form as a prelude to the more detailed description that is presented later.

Embodiments of the present invention address the above needs and/or achieve other advantages by providing apparatus, systems, computer program products, methods or the like for a technology-agnostic and protocol-agnostic modular-based system for delivering services including management over the provisioning of such services (i.e., deployment of services and updating such services with new versions and/or features). In this regard, present embodiments of the invention provide for a singular, shared approach to management of provisioning of all services provided by the service delivery system, thereby providing a more efficient approach that is easier to support and reduces overhead.

Management of the provisioning includes determining and automatically implementing optimal schedules for deploying services, updating versions of the services and rolling back versions of the services the based on one or more of (i) predetermined lifecycle levels (e.g., development, test, pre-production, production and the like) assigned to networked devices in the enterprise executing the service delivery application, and (ii) segments within the enterprise (e.g., divisions, lines of business (LOBs) and the like).

In addition, management of the provisioning includes denying/blocking execution of non-permitted service versions. Such denial/blocking of non-permitted versions may be accomplished by requiring networked devices in the enterprise that execute the service delivery application to verify a version being launched prior to executing the version.

In still further embodiments of the invention, management of the provisioning includes schedule and implementing deactivation of a declining service version, including alerting service delivery application users of a pending deactivation of a declining service version (e.g., an outdated version) and a need to download an emerging version (e.g., a new version). Moreover, in other embodiments herein described management of provisioning includes implementing side-loading of version updates to allow a user to simultaneously execute a current version while the version update is occurring.

A system for managing deployment and update of services within an enterprise, defines first embodiments of the invention. The system includes a distributed network of servers, wherein each server has an assigned/registered lifecycle level. The system further includes an operating system-agnostic, modular-based, service delivery application that is stored in network memory and executable by a processor. The application includes a plurality of modules, each module configured to deliver a service to the enterprise. The modules include a provisioning module configured to provide management over deployment of the services delivered by the modules and version updates to the services delivered by the modules, including determine and automatically implement an optimal schedule for service deployment and service version updates based on one or more of (i) predetermined lifecycle levels (e.g., development, test, pre-production, production and the like) assigned to networked devices in the enterprise executing the service delivery application, and (ii) segments within the enterprise (e.g., divisions, lines-of-business (LOBs) and the like).

In specific embodiments of the system, the provisioning module is further configured to determine and automatically implement the optimal schedule which provides for staging service deployment and service version updates over a predetermined period of time based on one or more of (i) the predetermined lifecycle levels assigned to the networked devices and (ii) the segments within the enterprise.

In other specific embodiments of the system, the provisioning module is further configured to automatically implement service version rollbacks. In specific embodiments of the invention, the provisioning module is further configured to determine and automatically implement an optimal schedule for the service version rollbacks based on one or more of (i) predetermined lifecycle levels assigned to networked devices in the enterprise that execute the service delivery application and (ii) segments within the enterprise.

In further specific embodiments of the system, the provisioning module is further configured deny execution of non-permitted service versions. In such embodiments of the system, the provisioning module may be further configured to deny execution of non-permitted service versions by requiring networked devices in the enterprise that execute the service delivery application to verify a version being launched prior to executing the version.

Moreover, in further specific embodiments of the system, the provisioning module is further configured to schedule deactivation of a declining service version. In this regard, the provisioning module may be further configured alert service delivery application users of a pending deactivation of a declining service version and a need to download an emerging version.

In still further embodiments of the system, the provisioning module is further configured to implement side-loading of version updates to allow a user to simultaneously execute a current version while the version update is occurring.

An apparatus for managing deployment and update of services within an enterprise defines second embodiments of the invention. The apparatus includes a computing platform having a memory and at least one processor in communication with the memory. The apparatus further includes an operating system-agnostic, modular-based, service delivery application that is stored in the memory and executable by the processor. The service delivery application includes a plurality of modules, each module configured to deliver a service to the enterprise. The modules include a provisioning module configured to provide management over deployment of the services delivered by the modules and version updates to the services delivered by the modules. The management over deployment and version updates includes determining and automatically implementing an optimal schedule for service deployment and service version updates based on one or more of (i) predetermined lifecycle levels (e.g., development, test, pre-production, production and the like) assigned to networked devices in the enterprise executing the service delivery application, and (ii) segments within the enterprise (divisions, departments, lines-of-business (LOBs) and the like).

In specific embodiments of the apparatus, the provisioning module is further configured to determine and automatically implement the optimal schedule which provides for staging service deployment and service version updates over a predetermined period of time based on one or more of (i) the predetermined lifecycle levels assigned to the networked devices and (ii) the segments within the enterprise.

In other specific embodiments of the apparatus, the provisioning module is further configured to determine and automatically implement an optimal schedule for service version rollbacks based on one or more of (i) predetermined lifecycle levels assigned to networked devices in the enterprise that execute the service delivery application and (ii) segments within the enterprise.

Moreover, in other specific embodiments of the apparatus, the provisioning module is configured to deny/block execution of non-permitted service versions. In such embodiments of the apparatus, the provisioning module may be configured to deny/block execution of non-permitted service versions by requiring networked devices in the enterprise that execute the service delivery application to verify a version being launched prior to executing the version.

In still further specific embodiments of the apparatus, the provisioning module is configured to schedule deactivation of a declining service version and/or alert service delivery application users of a pending deactivation of a declining service version and a need to download an emerging version. In still further specific embodiments of the apparatus, the provisioning module configured to implement side-loading of version updates to allow a user to simultaneously execute a current version while the version update is occurring.

A computer program product including a non-transitory computer-readable medium defines third embodiments of the invention. The computer-readable medium includes a first set of codes for causing a computer to a determine and automatically implement an optimal schedule for service deployment and service version updates based on one or more of (i) predetermined lifecycle levels assigned to networked devices in the enterprise executing the service delivery application and (ii) segments within the enterprise. The computer-readable medium additionally includes a second set of codes for causing a computer to determine and automatically implement an optimal schedule for service version rollbacks based on one or more of (i) predetermined lifecycle levels assigned to networked devices in the enterprise that execute the service delivery application, and (ii) segments within the enterprise.

Thus, systems, apparatus, methods, and computer program products herein described in detail below provide for a technology-agnostic and protocol-agnostic means for providing services within an enterprise including management over provisioning of the services (e.g., deploying new services and updating existing services). Specifically, embodiments herein described provide for managing provisioning by determination and automatic implementation of an optimal schedule for service deployment, service version updates and service version roll-backs. Such determination of the optimal schedule is based on (i) predetermined lifecycle levels assigned to networked devices in the enterprise executing the service delivery application, and/or (ii) segments within the enterprise. In further embodiments herein described, managing provisioning includes providing the ability to deny/block execution of non-permitted versions and alert users of declining/outdated versions and/or emerging new versions. Additionally, embodiments herein described provide for managing provisioning such that updates to revision occur by side-loading updated versions to allow for users to simultaneously use a declining version of a service while the emerging version is loaded.

To the accomplishment of the foregoing and related ends, the one or more embodiments comprise the features hereinafter fully described and particularly pointed out in the claims. The following description and the annexed drawings set forth in detail certain illustrative features of the one or more embodiments. These features are indicative, however, of but a few of the various ways in which the principles of various embodiments may be employed, and this description is intended to include all such embodiments and their equivalents.

BRIEF DESCRIPTION OF THE DRAWINGS

Having thus described embodiments of the invention in general terms, reference will now be made to the accompanying drawings, which are not necessarily drawn to scale, and wherein:

DETAILED DESCRIPTION OF EMBODIMENTS OF THE INVENTION

Embodiments of the present invention will now be described more fully hereinafter with reference to the accompanying drawings, in which some, but not all, embodiments of the invention are shown. Indeed, the invention may be embodied in many different forms and should not be construed as limited to the embodiments set forth herein; rather, these embodiments are provided so that this disclosure will satisfy applicable legal requirements. Like numbers refer to like elements throughout. Although some embodiments of the invention described herein are generally described as involving a "financial institution," one of ordinary skill in the art will appreciate that the invention may be utilized by other businesses that take the place of or work in conjunction with financial institutions to perform one or more of the processes or steps described herein as being performed by a financial institution.

As will be appreciated by one of skill in the art in view of this disclosure, the present invention may be embodied as an apparatus (e.g., a system, computer program product, and/or other device), a method, or a combination of the foregoing. Accordingly, embodiments of the present invention may take the form of an entirely hardware embodiment, an entirely software embodiment (including firmware, resident software, micro-code, etc.), or an embodiment combining software and hardware aspects that may generally be referred to herein as a "system." Furthermore, embodiments of the present invention may take the form of a computer program product comprising a computer-usable storage medium having computer-usable program code/computer-readable instructions embodied in the medium.

Any suitable computer-usable or computer-readable medium may be utilized. The computer usable or computer readable medium may be, for example but not limited to, an electronic, magnetic, optical, electromagnetic, infrared, or semiconductor system, apparatus, or device. More specific examples (e.g., a non-exhaustive list) of the computer-readable medium would include the following: an electrical connection having one or more wires; a tangible medium such as a portable computer diskette, a hard disk, a time-dependent access memory (RAM), a read-only memory (ROM), an erasable programmable read-only memory (EPROM or Flash memory), a compact disc read-only memory (CD-ROM), or other tangible optical or magnetic storage device.

Computer program code/computer-readable instructions for carrying out operations of embodiments of the present invention may be written in an object oriented, scripted or unscripted programming language such as Java, Perl, Smalltalk, C++ or the like. However, the computer program code/computer-readable instructions for carrying out operations of the invention may also be written in conventional procedural programming languages, such as the "C" programming language or similar programming languages.

Embodiments of the present invention are described below with reference to flowchart illustrations and/or block diagrams of methods or apparatuses (the term "apparatus" including systems and computer program products). It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a particular machine, such that the instructions, which execute by the processor of the computer or other programmable data processing apparatus, create mechanisms for implementing the functions/acts specified in the flowchart and/or block diagram block or blocks.

These computer program instructions may also be stored in a computer-readable memory that can direct a computer or other programmable data processing apparatus to function in a particular manner, such that the instructions stored in the computer readable memory produce an article of manufacture including instructions, which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions, which execute on the computer or other programmable apparatus, provide steps for implementing the functions/acts specified in the flowchart and/or block diagram block or blocks. Alternatively, computer program implemented steps or acts may be combined with operator or human implemented steps or acts in order to carry out an embodiment of the invention.

According to embodiments of the invention described herein, various systems, apparatus, methods, and computer program products are herein described for a technology-agnostic and protocol-agnostic system for delivering services, including management over the provisioning of such services (i.e., deployment of services and updating such services with new versions and/or features). In this regard, present embodiments of the invention provide for a singular, shared, common-stack approach to management of provisioning of all services provided by the service delivery system, thereby providing a more efficient approach that is easier to support and reduces overhead.

Management of the provisioning includes determining and automatically implementing optimal schedules (i.e., staging rollout) for deploying services, updating versions (otherwise referred to as revisions, patches, fixes and the like) of the services and rolling back versions of the services the based on one or more of (i) predetermined lifecycle levels (e.g., development, test, pre-production, production and the like) assigned to networked devices in the enterprise executing the service delivery application, and (ii) rules associated with segments within the enterprise (e.g., divisions, lines of business (LOBs) and the like).

In addition, management of the provisioning includes denying/blocking execution of non-permitted service versions. Such denial/blocking of non-permitted versions may be accomplished by requiring networked devices in the enterprise that execute the service delivery application to verify a version being launched prior to executing the version.

In still further embodiments of the invention, management of the provisioning includes schedule and implementing deactivation of a declining/outdated service version, including alerting service delivery application—users of a pending deactivation of a declining service version (e.g., an outdated version) and a need to activate or download an emerging version (e.g., a new version). Moreover, in other embodiments herein described management of provisioning includes implementing side-loading of version updates or new service modules to allow a user to simultaneously execute other modules or a current version while the version update is occurring.

Figure 1:
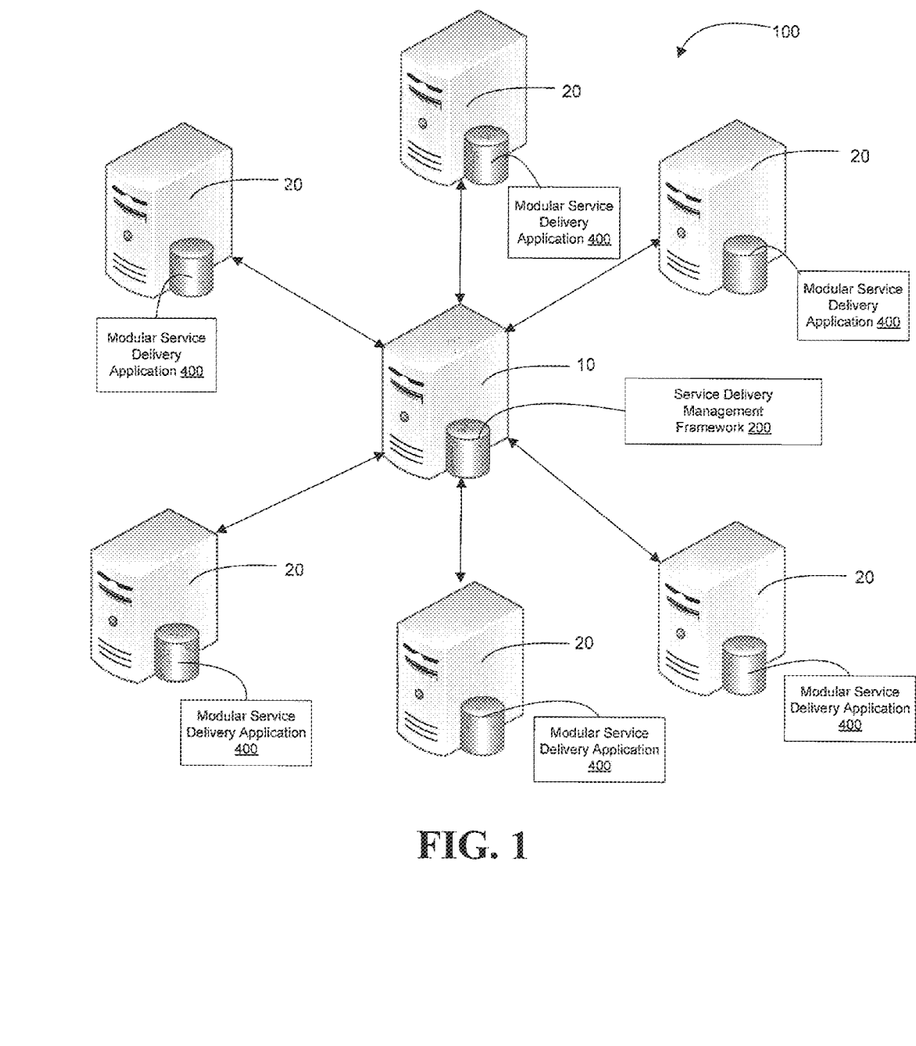
FIG. 1 provides a schematic diagram of a system for enterprise-wide service delivery including data movement/transfer and related management, in accordance with embodiments of the present invention.

Referring to FIG. 1, a schematic diagram is provided of a system 100 for providing technology/OS-agnostic and protocol-agnostic delivery of services within an enterprise. The system 100 is configured as a hub-and-spoke model, in which the hub server 10 provides for management of the service delivery system via service delivery management framework 200 and the spoke servers 20, implemented throughout the enterprise, are deployed with a modular service delivery application 400. The service delivery application 400 is an open source-based web-services application and, as such, can be deployed and/or executed on any type of server (technology-agnostic) executing any type of operating system (OS-agnostic). The modular nature of the application means that the service delivery system is extensible; as additional services are added new modules within the application 400 may be added/plugged-in into the application 400. As such, the present invention provides a holistic approach to service delivery that results in an enterprise-wide solution for service delivery.

Service delivery application 400 provides uniform management for all of the services delivered by service delivery application 400. In this regard, service delivery application 400 includes core services that act as a unifier to provide umbrella-like management over security, governance (approvals and exceptions), provisioning (new modules and revisions to modules), auditing, tracking, reporting and the like. Such uniformity in management provides efficiency and eliminates the need to resolve conflicts that arise in disparate applications having distinct security, governance, provisioning protocols, rules and regulations. For example, from a security perspective when individual protocol-specific data transfer applications are executed by an enterprise, each application will typically require a separate SSL (Secure Socket Layer) certificate to exist on each server; however, the present invention is configured such that only a single SSL certificate per server and the single SSL certificate can be used to authenticate all of the services delivered by the application 400. It should be noted that while the system only requires a single SSL certificate per server, the application 400 is configured to accommodate multiple SSL certificates if the application or a module within the application warrants such.

As previous noted, the service delivery application 400 includes a provisioning module (shown and described in FIGS. 2-4) that is configured to provide management over the deployment of new service modules within the service delivery application 400, as well as, version updates (or in some instance version rollbacks) to currently implemented service modules. In this regard, the provisioning module provides uniform management and control over all of the services delivered by the various modules included within the service delivery application 400. Management includes automatically determining and scheduling deployment updates/revision and/or new modules so as to limit the impact of the deployment on production use of the server and/or other associated resources.

In specific embodiments of the invention, the provisioning module is configured to determine and automatically implement an optimal schedule (i.e., staging) for deployment of new services or service modules, service revision updates and/or service revision rollbacks. The determination of the optimal schedule/staging may be based on one or more of (i) predetermined lifecycle levels assigned to networked devices 20 in the enterprise that execute the service delivery application 400 and/or (ii) rules associated with different segments of the enterprise.

For example, lifecycle levels may include, but are not limited to, development, system integration testing (SIT), user acceptance testing (UAT), pre-production and production. In this regard, a new service module may first be deployed/rolled-out to development-level networked devices/servers, followed by testing (SIT or UAT)-level networked devices/servers, followed by pre-production-level and production-level networked devices. Other factors, such as the features implemented in the new service module, the security risks posed by the new service module or the like may dictate how long implementation is limited to a specified level (e.g., how long the rollout is limited to being deployed only on development-level and/or test-level devices before rolling out the service module or pre-production-level devices and, subsequently, production-level devices). Further, an update to a version of a service may first be deployed/rolled-out to test-level networked devices, followed by pre-production-level and production-level networked devices (i.e., the nature of the version update may dictate that implementation at the development level is not warranted). Other factors, such as the features implemented in the updated version module, the security risks posed by the version being replaced or the like may dictate how long implementation is limited to a specified level.

Rules associated with segments within the enterprise may include rules associated with divisions, lines-of-business (LOBs) or other environments within the enterprise (i.e., any portion of the enterprise that requires service deployment rules). The rules, which may or may not be implemented in conjunction with lifecycle level deployment/updates, may dictate the order and the timing for new service/module deployment, as well as, updates to existing services/modules. Timing rules may ensure that deployment of new services and/or revisions occur so as to minimize the impact on other functions being performed by the networked device and/or service delivery application (i.e., during times when the application and/or device is undergoing minimal use).

Figure 2:
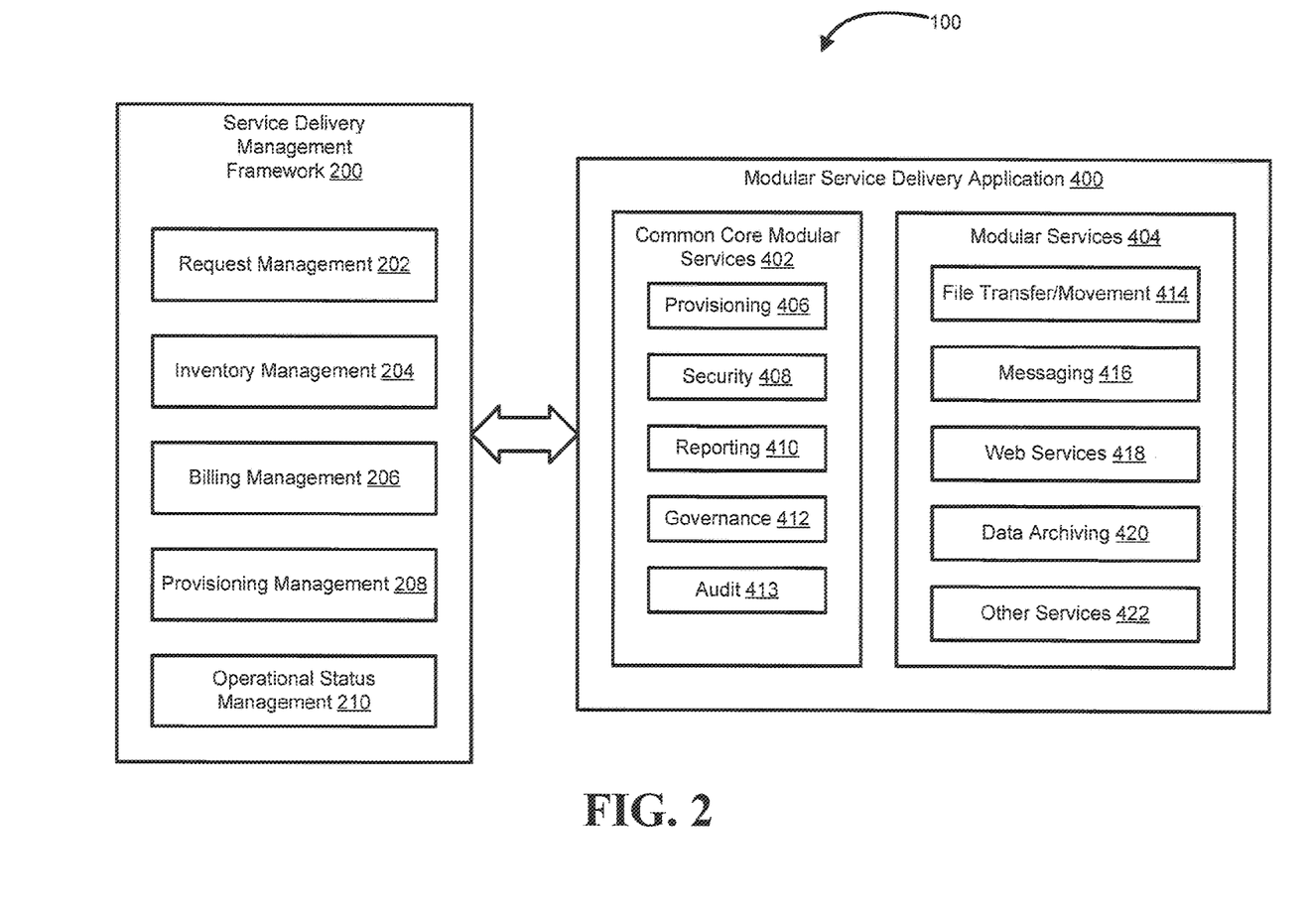
FIG. 2 provides a block diagram of a system for enterprise-wide service delivery including data movement/transfer and related management, in accordance with embodiments of the present invention.

Referring to FIG. 2, a block diagram is presented of a system 100 configured for providing technology/OS-agnostic and protocol-agnostic delivery of services within an enterprise, in accordance with an embodiment of the present invention. The system 100 includes modular service delivery application 400 that includes common core modular services 402 and modular services 404. The core services 402 are common to all of the modular services 404 in the application and provide for unified umbrella-like management of the modular services. The core services may include, but are not necessarily limited to, provisioning module 406, security module 408, reporting module 408 and governance/auditing module 410.

As previously noted, in accordance with embodiments of the present invention, the provisioning module service 406 is configured to provide for uniform management over the deployment of new modular services 404 and deployment of revisions/updates (i.e., new version) to existing modular services 404. In specific embodiments of the invention, as discussed in relation to FIG. 1, provisioning module service 406 is configured to provide hierarchical ordering of deployment based on criticality (i.e., lifecycle level of the), compliance and the like. Additionally, provisioning module service 406 is configured to automatically schedule deployment updates/revision and/or new modules so as to limit the impact of the deployment on production use of the server and/or other associated resources. Additionally, provisioning service 406 is configured to allow for non-compliant versions to be deployed with proper recordation/logging in place and for execution of non-permitted versions to be denied/blocked from executing.

The security service 408 provides uniform control over the security features applicable to the modular services 404. In this regard, the security service 408 provides uniform rules, regulations and procedures for security. For example, uniform rules related to authenticating a protocol/module, uniform rules associated with encryption, uniform rules for resolving a security conflict or the like.

The reporting service 410 provides uniform control over reporting functions associated with the modular services. For example, uniform control over what reporting is required, the contents of reports, parties receiving reports, actions that may result in alerts/notifications, parties receiving notification/alerts and the like.

The governance service 412 and audit service 413 provides uniform control over governance and auditing features applicable to the modular services. In this regard, the governance service 412 and audit service 413 provides uniform rules, regulations and procedures for rules exceptions, approval chains for granting exceptions, auditing procedures, auditing schedules and the like.

The modular services 404 provided by service delivery application 400 may include, but are not limited to, file transfer/movement module 414, messaging module 416, web services module 418, data archiving module 420 and any other service module 422.

File transfer/movement module 414 provides a unified open-source approach to moving data (e.g., file transfers, conducting transactions and the like) to and from devices (e.g., servers) deployed in the enterprise. The file transfer/data movement module 414 is configured to provide one consolidated methodology for accessing different operating systems and networked devices to move data to and from networked devices. As such, the file transfer/data movement module 414 provides a full-service, holistic approach that can be implemented enterprise-wide; obviating the need to deploy and maintain numerous disparate protocol and operating system-specific file transfer applications. In specific embodiments of the invention, the file transfer/movement module 414 is configured to provide a web-accessible view to manage file transfer/data movement, as well as track/monitor the movement of data within the enterprise in real-time or near real-time.

In specific embodiments of the invention, the file transfer/movement module 414 is configured to provide for data movement/file transfer at the device-level and/or at the application-level, such that data can be moved from one networked device to another, from one networked device to an application, or from one application to another application. In further specific embodiments of the invention, the file transfer/data movement module 414 relies on the request management 202 function of the service delivery management framework 200 to provide a requisite protocol for file transfer, thus, eliminating the need to locate and implement a secondary network device to perform protocol-agnostic data movement/file transfer. As a result complexity and overhead are significantly reduced.

Moreover, in additional embodiments of the invention, the file transfer/movement module 414 is configured to provide entitlements at the server-level or at the data-level, as opposed to granting entitlements at the user-level. In this regard, the file transfer/module 414 looks at whether movement of data is permissible from device-to-device and/or application-to-application. A user is granted access to the file transfer/movement module 414 and may be pre-configured to perform certain actions within the file transfer/movement module 414 (i.e., the user has access at the application/module-level and may be provided granular access to perform specific actions only). If two network devices and/or two applications are configured so to be entitled for data transfer (i.e., entitled for a data connection/file transfer) any module user, pre-configured to use the module and perform the requisite function, can request data movement/file transfer between the devices and/or applications. In this regard, unlike conventional, file transfer applications, the user is not required to have nor are they provided physical access to the devices from which data is communicated and/or received. As a result, the devices from which the data is communicated and received remain secure throughout the data movement/file transfer/transaction process, since the user does not have physical access to the devices and, therefore, does have access to other files/data stored on those devices (e.g., exploit vulnerabilities associated with having to log-on to the servers/devices).

In additional embodiments of the invention, the file transfer/movement module 414 is configured to implement a device/server rating system as a means of determining whether the devices are entitled for a data connection (e.g., whether the devices can exchange data/conduct transactions or the like). In specific embodiments of the invention, the rating system may be based on the type of data that a device is configured to send or receive (e.g., confidential data, proprietary data, public data and the like). In other specific embodiments of the invention, a secondary rating may be provided to account for the geographic location of the device within the enterprise (taking into account that certain geographic locations/countries may have rules/laws in place restricting the type of data that may be communicated/received within the countries geographic locale/boundaries).

Messaging module 416 provides a unified open-source approach to message brokering/queuing. The messaging module may comprise message-oriented middleware that supports sending and receiving messages between distributed systems. The messaging module allows application modules to be distributed over heterogeneous platforms and reduces the complexity of developing applications that span multiple operating systems and network protocols. The module 416 creates a distributed communications layer that insulates the module from specifics of operating systems and network interfaces. As such, the messaging module 414 provides a full-service, holistic approach that can be implemented enterprise-wide; obviating the need to deploy and maintain numerous disparate protocol and operating system-specific messaging applications.

Web services module 418 is configured to provide a unified open-source approach to enabling legacy applications that do not include web services with web services capabilities. In this regard, the web service module 418 communicates with the legacy application to create a web services interface and/or provide a web browser. The web services module 418 is configured to provide one consolidated methodology for accessing different operating systems and networked devices enable legacy applications with web services capabilities. As such, the web services module 418 provides a full-service, holistic approach that can be implemented enterprise-wide; obviating the need to deploy and maintain numerous disparate protocols and operating system-specific web services applications.

Data archiving module 420 is configured to provide a unified open-source approach to data archiving. The data archiving module 420 is configured to provide one consolidated methodology for accessing different operating systems and networked devices to archive data. As such, the data archiving module 420 provides a full-service, holistic approach that can be implemented enterprise-wide; obviating the need to deploy and maintain numerous disparate protocol and operating system-specific data archiving applications.

Additionally, service delivery application 404 may include other known or future-known service modules 422, which can be configured to provide a consolidated methodology for accessing operating systems and network devices to perform the desired service.

Service delivery management framework 200 is a web services framework which serves to integrate and connect the services provided by the service delivery application 400. Service delivery management framework 200 is extensible and may be configured, in specific embodiments to include, request management 202, inventory management 204, billing management 206, provisioning management 208 and operational status management 210. As previously discussed, request management 202 is configured to manage a request to deliver a service provided by service delivery application 400, include a request to move data/transfer a file or the like. Request management 202 may include configuring the service, verifying security and compliance, verifying/receiving requisite approval chain and the like. Billing management 206 is configured to automatically determine the volume of data being moved/transferred, apply a billing rate to the data being moved/transferred, determine a billing entity associated with the data and communicate billing data (e.g., invoice) to the billing entity. Provisioning management 208 is configured to work in unison with the provisioning service 406 in the common core services 402 of the delivery service application 400 to provide a unified approach to provisioning new modules and updates/revisions to existing modules. Such provisioning management includes determining deployment times and schedules and the like. Operational status management 210 includes providing a user interface that is configured to provide real-time access to tracking data and performance metrics, such as real-time tracking of data movement/file transfer within the enterprise.

Figure 3:
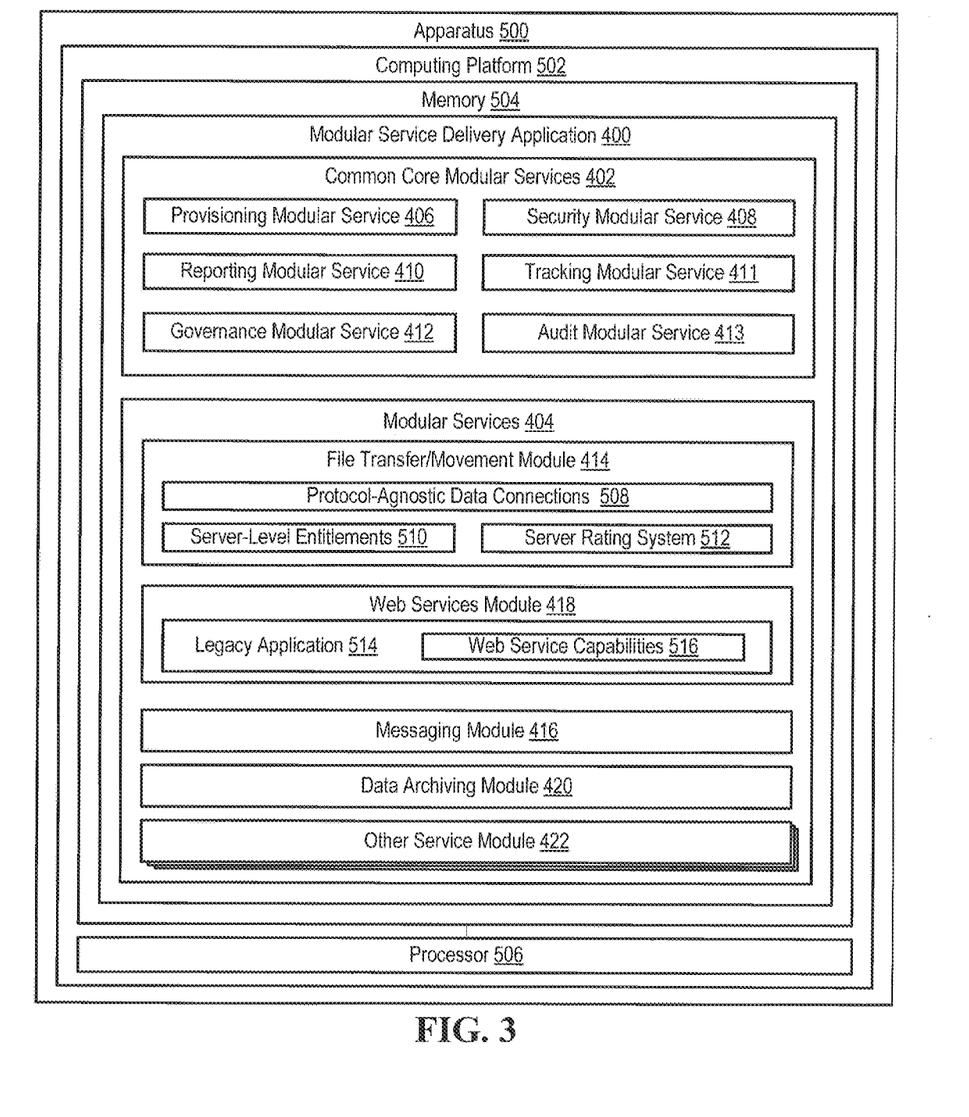
FIG. 3 provides a block diagram of the apparatus configured for an extensible module system including technology/OS-agnostic and protocol-agnostic data movement, in accordance with embodiments of the present invention.

Referring to FIG. 3 a block diagram is presented of the apparatus 500, which is configured for providing technology/OS-agnostic and protocol-agnostic delivery of services within an enterprise, in accordance with embodiments of the present invention. In addition to providing greater detail, FIG. 3 highlights various alternate embodiments of the invention. The apparatus 500 may include one or more of any type of computing device, such as a server or the like. The present apparatus and methods can accordingly be performed on any form of one or more computing devices.

The apparatus 500 includes computing platform 502 that can receive and execute algorithms, such as routines, and applications. Computing platform 502 includes memory 504, which may comprise volatile and non-volatile memory, such as read-only and/or random-access memory (RAM and ROM), EPROM, EEPROM, flash cards, or any memory common to computer platforms. Further, memory 504 may include one or more flash memory cells, or may be any secondary or tertiary storage device, such as magnetic media, optical media, tape, or soft or hard disk. Moreover, memory 504 may comprise cloud storage, such as provided by a cloud storage service and/or a cloud connection service.

Further, computing platform 502 also includes processor 506, which may be an application-specific integrated circuit ("ASIC"), or other chipset, processor, logic circuit, or other data processing device. Processor 506 or other processor such as ASIC may execute an application programming interface ("API") (not shown in FIG. 3) that interfaces with any resident programs, such as service delivery application 400 and routines, sub-modules associated therewith or the like stored in the memory 504 of the apparatus 500.

Processor 506 includes various processing subsystems (not shown in FIG. 3) embodied in hardware, firmware, software, and combinations thereof, that enable the functionality of apparatus 500 and the operability of the apparatus on a network. For example, processing subsystems allow for initiating and maintaining communications and exchanging data with other networked devices, such as hub server (10 of FIG. 1). For the disclosed aspects, processing subsystems of processor 506 may include any subsystem used in conjunction with service delivery application 400 and related algorithms, sub-algorithms, modules, sub-modules thereof.

Computer platform 502 may additionally include communications module (not shown in FIG. 3) embodied in hardware, firmware, software, and combinations thereof, that enables communications among the various components of the apparatus 500, as well as between the other networked devices. Thus, communication module may include the requisite hardware, firmware, software and/or combinations thereof for establishing and maintaining a network communication connection.

The memory 504 of apparatus 500 stores service delivery application 400 that is a modular-based, operating-system agnostic and protocol-agnostic means for providing services throughout an enterprise. In this regard, since the services that are provided are not tied to any one operating system or any one protocol, the service delivery application eliminates the need for the enterprise to execute and maintain a multitude of operating system-specific and protocol-specific service applications. As such, the service delivery application is instrumental in decreasing overhead costs associated with maintaining the multitude of diverse service applications. For example, the data transfer module 414 included in the service delivery application 400 eliminates the need for the enterprise to execute, maintain and ensure compatibility numerous different file transfer applications that may be specific to operating systems/hardware and operating using specific file transfer protocols.

In addition, the modular-based service delivery application 400 provides for comprehensive and unified management over the services delivered by the application 400. Such unified and comprehensive management of the services is accomplished by the common core services 402 included in the application 400. The common core modular services 402 are common to all of the modular services 404 in the application 400. The core modular services may include, but are not necessarily limited to, provisioning module 406, security module 408, reporting module 408, governance module 410, tracking module 411 and auditing module 412. These core modular services may be applied to any of the modular services to which the core service is applicable. The application may be configured such that a user has access to one or more user-interfaces/dashboards that allow for the user to manage and/or view the common core services. The user-interface/dashboard may be configured to be specific to a common core service (e.g., such that each common core service UI/dashboard provides access to and control over each of the modular services 404) and/or specific to a modular service (e.g., such that each modular service UI/dashboard provides access to and control over each of the common core services for the specified modular service).

The provisioning module service 406 is configured to provide for uniform deployment of new modular services 404 and deployment of revisions/updates to existing modular services 404. In specific embodiments of the invention, as discussed previously in relation to FIG. 1 and infra. In relation to FIG. 4, the provisioning module service 406 is configured to determine and automatically implement an optimal schedule (i.e., staging) for deployment of new services or service modules, service revision updates and/or service revision rollbacks. The determination of the optimal schedule/staging may be based on one or more of (i) predetermined lifecycle levels assigned to networked devices 20 in the enterprise that execute the service delivery application 400 and/or (ii) rules associated with different segments of the enterprise.

The security module service 408 is configured to provide uniform control over the security features applicable to the modular services 404. In this regard, the security module service 408 provides uniform rules, regulations and procedures for security. For example, the security module service 408 provides uniform rules related to authenticating a protocol/module, uniform rules associated with encryption, uniform rules for resolving a security conflict or the like. The reporting module service 410 provides uniform control over reporting functions associated with the modular services. For example, the reporting module service 410 provides uniform control over what reporting is required, the contents of reports, parties receiving reports, and the like.

The governance module service 412 is configured to provide uniform control over governance including, but not limited to, rules, regulations and procedures for rule exceptions, approval chains for granting exceptions and the like. The tracking service 411 is configured to provide uniform control and management over tracking functions associated with the modular services; such as, but not limited, tracking file transfer/data movement throughout the enterprise. The auditing service 413 is configured to provide uniform control auditing requirements, such as, but not limited to, auditing procedures, auditing schedules and the like.

The modular services 404 provided by service delivery application 400 are dictated by the needs of the enterprise and, therefore, will vary from enterprise-to-enterprise. In addition, since the system is modular-based additional modules can be inserted into the application 400 on an as needed basis. In specific embodiments of the invention, the modular services 404 included in the application 400 include file transfer/movement module 414 that is configured to provides a unified open-source approach to moving data (e.g., file transfers, conducting transactions and the like) to and from devices (e.g., servers) and/or applications deployed in the enterprise. In this regard, the file transfer/movement module 414 is configured to establish protocol-agnostic data connections 508 between networked devices (e.g., services) or applications residing in networked devices and to initiate data movement, file transfers, transactions via the established data connections.

As previously noted the file transfer/data movement module 414 is configured to provide one consolidated methodology for accessing different operating systems and networked devices to move data to and from networked devices. As such, the file transfer/data movement module 414 provides a full-service, holistic approach that can be implemented enterprise-wide; obviating the need to deploy and maintain numerous disparate protocol and operating system-specific file transfer applications.

Moreover, in additional embodiments of the invention, the file transfer/movement module 414 is configured to provide server-level entitlements 510, as opposed to granting entitlements at the user-level. In this regard, the file transfer/module 414 looks at whether movement of data is permissible from device-to-device and/or application-to-application. A user is granted access to the file transfer/movement module 414 and may be pre-configured to perform certain actions within the file transfer/movement module 414 (i.e., the user has access at the application/module-level and may be provided granular access to perform specific actions only). If two network devices and/or two applications are configured so to be entitled for data transfer (i.e., entitled for a data connection/file transfer) any module user, pre-configured to use the module and perform the requisite function, can request data movement/file transfer between the devices and/or applications. In this regard, unlike conventional, file transfer applications, the user is not required to have nor are they provided physical access to the devices from which data is communicated and/or received.

In additional embodiments of the invention, the file transfer/movement module 414 is configured to implement a device/server rating system 512 as a means of determining whether the devices are entitled for a data connection (e.g., whether the devices can exchange data/conduct transactions or the like). In specific embodiments of the invention, the rating system may be based on the type of data that a device is configured to send or receive (e.g., confidential data, proprietary data, public data and the like). In other specific embodiments of the invention, a secondary rating may be provided to account for the geographic location of the device within the enterprise (taking into account that certain geographic locations/countries may have rules/laws in place restricting the type of data that may be communicated/received within the countries geographic locale/boundaries).

In accordance with other embodiments of the invention, additional optional modular services 404 may include web services module 418, messaging module 416, data archiving module 420 and any other service module 422. Web services module 418 is configured to provide a unified open-source approach to enabling legacy applications that do not include web services with web services capabilities. In this regard, the web service module 418 communicates with the legacy application to create a web services interface and/or provide a web browser. The web services module 418 is configured to provide one consolidated methodology for accessing different operating systems and networked devices enable legacy applications with web services capabilities. Messaging Module 416 provides a unified open-source approach to message brokering/queuing. The messaging module 416 may comprise message-oriented middleware that supports sending and receiving messages between distributed systems. The messaging module allows application modules to be distributed over heterogeneous platforms and reduces the complexity of developing applications that span multiple operating systems and network protocols. The module 416 creates a distributed communications layer that insulates the module from specifics of operating systems and network interfaces. Data archiving module 420 is configured to provide a unified open-source approach to data archiving. The data archiving module 420 is configured to provide one consolidated methodology for accessing different operating systems and networked devices to archive data.

Figure 4:
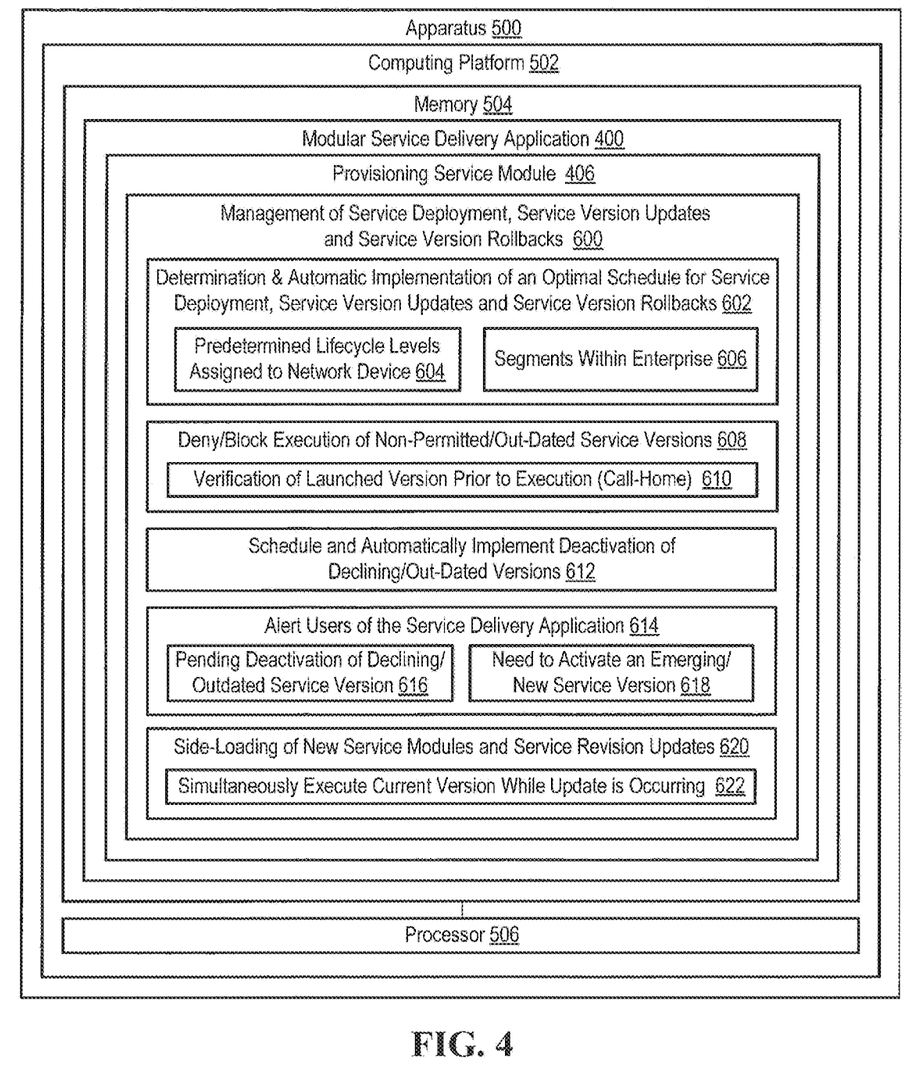
FIG. 4 provides a block diagram of an apparatus configured for managing the provisioning of services in an enterprise-wide modular-based service delivery system, in accordance with embodiments of the present invention.

Referring to FIG. 4 a block diagram is presented of the apparatus 500, which is configured for providing technology/OS-agnostic and protocol-agnostic delivery of services within an enterprise including a provisioning module for managing deployment of new services/modules and updates to existing services/modules, in accordance with embodiments of the present invention. In addition to providing greater detail, FIG. 4 highlights various alternate embodiments of the invention. The apparatus 500 may include one or more of any type of computing device, such as a server or the like. The present apparatus and methods can accordingly be performed on any form of one or more computing devices.

The apparatus 500 includes computing platform 502 that can receive and execute algorithms, such as routines, and applications. Computing platform 502 includes memory 504, which may comprise volatile and non-volatile memory, such as read-only and/or random-access memory (RAM and ROM), EPROM, EEPROM, flash cards, or any memory common to computer platforms. Further, memory 504 may include one or more flash memory cells, or may be any secondary or tertiary storage device, such as magnetic media, optical media, tape, or soft or hard disk. Moreover, memory 504 may comprise cloud storage, such as provided by a cloud storage service and/or a cloud connection service.

Further, computing platform 502 also includes processor 506, which may be an application-specific integrated circuit ("ASIC"), or other chipset, processor, logic circuit, or other data processing device. Processor 506 or other processor such as ASIC may execute an application programming interface ("API") (not shown in FIG. 4) that interfaces with any resident programs, such as service delivery application 400 and routines, sub-modules associated therewith or the like stored in the memory 504 of the apparatus 500.

Processor 506 includes various processing subsystems (not shown in FIG. 4) embodied in hardware, firmware, software, and combinations thereof, that enable the functionality of apparatus 500 and the operability of the apparatus on a network. For example, processing subsystems allow for initiating and maintaining communications and exchanging data with other networked devices, such as hub server (10 of FIG. 1). For the disclosed aspects, processing subsystems of processor 506 may include any subsystem used in conjunction with service delivery application 400 and related algorithms, sub-algorithms, modules, sub-modules thereof.

Computer platform 502 may additionally include communications module (not shown in FIG. 4) embodied in hardware, firmware, software, and combinations thereof, that enables communications among the various components of the apparatus 500, as well as between the other networked devices. Thus, communication module may include the requisite hardware, firmware, software and/or combinations thereof for establishing and maintaining a network communication connection.

The memory 504 of apparatus 500 stores service delivery application 400 that is configured to provide operating system-agnostic, modular-based delivery of services throughout an enterprise, in accordance with embodiments of the present invention. The service delivery application 400 includes a plurality of modules, such that each module delivers one or more services to the enterprise and are interchangeable, such that new modules can added to (or removed from) the service delivery application.

Included amongst the plurality of modules is provisioning module 406 that is configured to provide management 600 over services delivered by the modules, and version updates to the services delivered by the modules. In additional embodiments, provisioning module 406 is further configured to provide management over version rollbacks (e.g., progressing from a higher revision to a lower revision, typically due to a version update being implemented that has errors or is otherwise subsequently found to be defective).

In specific embodiments of the invention, the provisioning module 406 is configured to determine and automatically implement an optimal schedule 602 (i.e., staging) for deployment of new services or service modules, service revision updates and/or service revision rollbacks. The determination of the optimal schedule/staging may be based on one or more of (i) predetermined lifecycle levels 604 assigned to networked devices in the enterprise that execute the service delivery application 400 and/or (ii) rules associated with different segments of the enterprise 606.

For example, lifecycle levels may include, but are not limited to, development, system integration testing (SIT), user acceptance testing (UAT), pre-production and production. In this regard, a new service module may first be deployed/rolled-out to development-level networked devices/servers, followed by testing (SIT or UAT)-level networked devices/servers, followed by pre-production-level and production-level networked devices. Other factors, such as the features implemented in the new service module, the security risks posed by the new service module or the like may dictate how long (e.g., 30 days, 90 days or the like) implementation is limited to or required at a specified level (e.g., how long the rollout is limited to being deployed only on development-level and/or test-level devices before rolling out the service module or pre-production-level devices and, subsequently, production-level devices). Further, an update to a version of a service may first be deployed/rolled-out to test-level networked devices, followed by pre-production-level and production-level networked devices (i.e., the nature of the version update may dictate that implementation at the development level is not warranted). Other factors, such as the features implemented in the updated version module, the security risks posed by the version being replaced or the like may dictate how long implementation is limited to a specified level.

Rules associated with segments within the enterprise 606 may include rules associated with divisions, lines-of-business (LOBs) or other environments within the enterprise (i.e., any portion of the enterprise that requires service deployment rules). The rules, which may or may not be implemented in conjunction with lifecycle level deployment/updates, may dictate the order and the timing for new service/module deployment, as well as, updates to existing services/modules. Timing rules may ensure that deployment of new services and/or revisions occur so as to minimize the impact on other functions being performed by the networked device and/or service delivery application (i.e., during times when the application and/or device is undergoing minimal use).

Additionally, in the event that service deployment or revision update of a service results in predetermined errors at any level of the deployment, the provisioning module 406 may be configured to recognize such errors and, based on the nature and/or type of error, automatically re-determine updated optimal schedules for deployment and/or update of services. For example, if the provisioning module 406 identifies a serious error at the development-level of deployment of a new service module, further deployment may be suspended until the error is deemed corrected and future optimal staging of the deployment may be adjusted to account for the error (i.e., the revised version may remain in the development-level for a longer period of time to ensure that the reason behind the previous error has been properly addressed and is no longer prevalent).

In additional embodiments of the invention, the provisioning module 400 is further configured to deny/block execution 608 of non-permitted/outdated service versions. In specific embodiments, the service modules are configured such that upon user request to implement a service (i.e., launch, prior to execution, the service module will send a communication (referred to as "call-home") to the provisioning module to verify 610 that the version that they are running is a valid, permitted version of the service. If the user is denied/blocked from executing the non-permitted or outdated version of the service, the provisioning module 406 may be configured to deploy an update, schedule an update and notify/alert the user of the scheduled update and/or alert the user that an update is required prior to executing the service.

In further specific embodiments of the invention, the provisioning module 400 is configured to determine scheduling and automatically implement deactivation of a declining/outdated version 612. In certain embodiments of the invention, a declining/outdated version can still be executed during the period in which the emerging/updated version is being deployed. In such instances, the declining/outdated version will be scheduled for deactivation, either simultaneously across all networked devices implementing the services or on a device-to-device basis, and deactivation will automatically occurred according to an optimally determined schedule or staging for the deactivation.

Moreover, in additional embodiments of the invention, the provisioning module 406 is configured to communicate alerts 614 to users of the service delivery application 400. In specific embodiments of the invention, the alerts 614 may be configured to notify the users of a pending deactivation 616 of a declining/outdated service version including a stated time for deactivation. In other specific embodiments of the invention, the alert 614 may be configured to notify the user (individual, group or system) of a need to activate/download or otherwise acquire (e.g., schedule) an emerging/new version of a service 618. In certain embodiments of the invention that alert 614 that is configured to notify the user of a declining/outdated version 616 may be additionally configured to notify the user of the need to activate/acquire the emerging/new version 618 of the service.

Additionally, the provisioning module 400 may be configured to provide for side-loading 620 of new services, version updates, patches, fixes or the like. Side-loading allows for an update/new version of a service to be loaded on a device/server while the existing/current version of the service is simultaneously executing 622 on the device/server. Additionally, side-loading allows for new services/modules to be implemented/loaded into the service delivery application without affecting the ability of other services to simultaneously execute on the device/server.

Thus, systems, apparatus, methods, and computer program products described above provide for a technology-agnostic and protocol-agnostic means for delivering services within an enterprise, including management over provisioning of the services (e.g., deploying new services and updating existing services). Specifically, embodiments herein described provide for managing provisioning by determination and automatic implementation of an optimal schedule for service deployment, service version updates and service version rollbacks. Such determination of the optimal schedule is based on (i) predetermined lifecycle levels assigned to networked devices in the enterprise executing the service delivery application, and/or (ii) segments within the enterprise. In further embodiments herein described, managing provisioning includes providing the ability to deny/block execution of non-permitted versions and alert users of declining/outdated versions and/or emerging new versions. Additionally, embodiments herein described provide for managing provisioning such that updates to revision occur by side-loading updated versions to allow for users to simultaneously use a declining version of a service while the emerging version is loaded.

While certain exemplary embodiments have been described and shown in the accompanying drawings, it is to be understood that such embodiments are merely illustrative of and not restrictive on the broad invention, and that this invention not be limited to the specific constructions and arrangements shown and described, since various other changes, combinations, omissions, modifications and substitutions, in addition to those set forth in the above paragraphs, are possible.

Those skilled in the art may appreciate that various adaptations and modifications of the just described embodiments can be configured without departing from the scope and spirit of the invention. Therefore, it is to be understood that, within the scope of the appended claims, the invention may be practiced other than as specifically described herein.

What is claimed is:

1. A system for managing deployment and update of services within an enterprise, the system comprising:
a distributed network of servers, wherein each server has an assigned lifecycle level;
a computing platform including network memory and a processor in communication with the memory; and
an operating system-agnostic, modular-based, service delivery application stored in the network memory, executable by the processor and including a plurality of modules, each module configured to deliver a service to the enterprise, wherein the modules include:
a provisioning module configured to provide management over deployment of the services delivered by the modules and version updates to the services delivered by the modules, including:
determine and automatically implement an optimal schedule for service deployment and service version updates based on predetermined lifecycle levels assigned to networked devices in the enterprise executing the service delivery application,
deny execution of non-permitted service versions by requiring networked devices in the enterprise that execute the service delivery application to verify a version being launched prior to executing the version, and
schedule deactivation of a declining service version and alert service delivery application users of the scheduled deactivation of the declining service version and a need to download an emerging version.

2. The system of claim 1, wherein the provisioning module is further configured to determine and automatically implement the optimal schedule for service deployment and service version updates, wherein the optimal schedule comprises staging service deployment and service version updates over a predetermined period of time based on the predetermined lifecycle levels assigned to the networked devices.

3. The system of claim 1, wherein the provisioning module is further configured to determine and automatically implement the optimal schedule for service deployment and service version updates based on predetermined lifecycle level, wherein the predetermined lifecycle levels include (1) development, (2) System Integration Testing (SIT), (3) User Acceptance Testing (UAT), (4) pre-production and (5) production.

4. The system of claim 1, wherein the provisioning module is further configured to automatically implement service version rollbacks.

5. The system of claim 4, wherein the provisioning module is further configured to determine and automatically implement an optimal schedule for the service version rollbacks based on the predetermined lifecycle levels assigned to networked devices in the enterprise that execute the service delivery application.

6. The system of claim 1, wherein the provisioning module is further configured to provide management over deployment of the services delivered by the modules and version updates to the services delivered by the modules, including implement side-loading of version updates to allow a user to simultaneously execute a current version while the version update is occurring.

7. An apparatus for managing deployment and update of services within an enterprise, the apparatus comprising:
 a computing platform having a memory and at least one processor in communication with the memory; and
 an operating system-agnostic, modular-based, service delivery application stored in the memory, executable by the processor and including:
  a plurality of modules, each module configured to deliver a service to the enterprise, wherein the modules include,
  a provisioning module configured to provide management over deployment of the services delivered by the modules and version updates to the services delivered by the modules, including:
   determine and automatically implement an optimal schedule for service deployment and service version updates based on predetermined lifecycle levels assigned to networked devices in the enterprise executing the service delivery application,
   deny execution of non-permitted service versions by requiring networked devices in the enterprise that execute the service delivery application to verify a version being launched prior to executing the version, and
   schedule deactivation of a declining service version and alert service delivery application users of the scheduled deactivation of the declining service version and a need to download an emerging version.

8. The apparatus of claim 7, wherein the provisioning module is further configured to determine and automatically implement the optimal schedule for service deployment and service version updates, wherein the optimal schedule comprises staging service deployment and service version updates over a predetermined period of time based on the predetermined lifecycle levels assigned to the networked devices.

9. The apparatus of claim 7, wherein the provisioning module is further configured to determine and automatically implement an optimal schedule for service version rollbacks based on the predetermined lifecycle levels assigned to networked devices in the enterprise that execute the service delivery application.

10. The apparatus of claim 7, wherein the provisioning module configured to provide management over deployment of the services delivered by the modules and version updates to the services delivered by the modules, including implement side-loading of version updates to allow a user to simultaneously execute a current version while the version update is occurring.

11. A computer program product comprising:
 a non-transitory computer-readable medium comprising:
  a first set of codes for causing a computer to a determine and automatically implement an optimal schedule for service deployment and service version updates based on predetermined lifecycle levels assigned to networked devices in the enterprise executing the service delivery application;
  a second set of codes for causing a computer to determine and automatically implement an optimal schedule for service version rollbacks based on one or more of (i) predetermined lifecycle levels assigned to networked devices in the enterprise that execute the service delivery application, and (ii) segments within the enterprise;
  a third set of codes for causing a computer to deny execution of non-permitted service versions by requiring networked devices in the enterprise that execute the service delivery application to verify a version being launched prior to executing the version; and
  a fourth set of codes for causing a computer to schedule deactivation of a declining service version and alert service delivery application users of the scheduled deactivation of the declining service version and a need to download an emerging version.

\* \* \* \* \*